US010863335B2

(12) United States Patent
Koravadi

(10) Patent No.: US 10,863,335 B2
(45) Date of Patent: Dec. 8, 2020

(54) VEHICLE TRAILER ANGLE DETECTION SYSTEM USING SHORT RANGE COMMUNICATION DEVICES

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 692 days.

(21) Appl. No.: 15/446,220

(22) Filed: Mar. 1, 2017

(65) Prior Publication Data

US 2017/0254873 A1  Sep. 7, 2017

Related U.S. Application Data

(60) Provisional application No. 62/303,546, filed on Mar. 4, 2016.

(51) Int. Cl.
| | |
|---|---|
| *H04W 4/80* | (2018.01) |
| *H04L 29/08* | (2006.01) |
| *H04W 4/40* | (2018.01) |
| *G01S 3/14* | (2006.01) |
| *G01S 3/28* | (2006.01) |
| *G01S 19/45* | (2010.01) |
| *G01S 19/53* | (2010.01) |

(52) U.S. Cl.
CPC ............. *H04W 4/80* (2018.02); *G01S 3/14* (2013.01); *G01S 3/28* (2013.01); *G01S 19/45* (2013.01); *G01S 19/53* (2013.01); *H04L 67/12* (2013.01); *H04W 4/40* (2018.02)

(58) Field of Classification Search
CPC . G01S 19/45; G01S 19/53; G01S 3/14; G01S 3/28; H04L 67/12; H04W 4/40; H04W 4/80
USPC ........................................................ 342/419
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |

(Continued)

*Primary Examiner* — Timothy X Pham
(74) *Attorney, Agent, or Firm* — Honigman LLP

(57) ABSTRACT

A communication system for vehicles includes a first communication device disposed at a trailer and a second communication device disposed at a vehicle. The communication device wirelessly transmits a communication to the second communication device, and the second communication device receives the transmitted communication from the first communication device. Responsive to processing of the transmitted communication received by the second communication device, the communication system determines an angle of the trailer relative to the vehicle. The first and second communication devices may include first and second dedicated short range communication devices. One of the devices may include spaced apart antennae, whereby the system may determine the angle of the trailer via triangulation based on an antenna of one of the communication devices and the spaced apart antennae of the other of the communication devices.

13 Claims, 5 Drawing Sheets

(56) References Cited

U.S. PATENT DOCUMENTS

| | | |
|---|---|---|
| 5,929,786 A | 7/1999 | Schofield et al. |
| 5,949,331 A | 9/1999 | Schofield et al. |
| 6,201,642 B1 | 3/2001 | Bos |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,690,268 B2 | 2/2004 | Schofield et al. |
| 6,693,517 B2 | 2/2004 | McCarthy et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,156,796 B2 | 1/2007 | Makley |
| 7,580,795 B2 | 8/2009 | McCarthy et al. |
| 7,720,580 B2 | 5/2010 | Higgins-Luthman |
| 7,859,565 B2 | 12/2010 | Schofield et al. |
| 7,881,496 B2 | 2/2011 | Camilleri et al. |
| 8,694,224 B2 | 4/2014 | Chundrlik, Jr. et al. |
| 9,036,026 B2 | 5/2015 | Dellantoni et al. |
| 9,085,261 B2 | 7/2015 | Lu et al. |
| 9,900,490 B2 | 2/2018 | Ihlenburg et al. |
| 2012/0062743 A1 | 3/2012 | Lynam et al. |
| 2012/0218412 A1 | 8/2012 | Dellantoni et al. |
| 2014/0005918 A1* | 1/2014 | Qiang .................. B60D 1/245 701/300 |
| 2014/0012465 A1* | 1/2014 | Shank .................. B60D 1/58 701/36 |
| 2014/0085472 A1* | 3/2014 | Lu ...................... B60R 1/002 348/148 |
| 2014/0160276 A1 | 6/2014 | Pliefke et al. |
| 2014/0288769 A1* | 9/2014 | Trombley ............ B62D 13/06 701/34.4 |
| 2014/0340510 A1 | 11/2014 | Ihlenburg et al. |
| 2015/0002670 A1 | 1/2015 | Bajpai |
| 2015/0124096 A1 | 5/2015 | Koravadi |
| 2015/0158499 A1 | 6/2015 | Koravadi |
| 2015/0217693 A1 | 8/2015 | Pliefke et al. |
| 2015/0251599 A1 | 9/2015 | Koravadi |
| 2015/0321697 A1* | 11/2015 | Lu ...................... B60D 1/245 701/28 |
| 2015/0352953 A1 | 12/2015 | Koravadi |
| 2016/0052548 A1* | 2/2016 | Singh .................. B60D 1/36 701/37 |
| 2016/0210853 A1 | 7/2016 | Koravadi |
| 2016/0381571 A1 | 12/2016 | Koravadi et al. |
| 2017/0050672 A1 | 2/2017 | Gieseke et al. |
| 2017/0136839 A1* | 5/2017 | Burkhart .............. B60D 1/06 |
| 2017/0158133 A1 | 6/2017 | Chundrlik, Jr. et al. |
| 2017/0217372 A1 | 8/2017 | Lu et al. |
| 2017/0254873 A1 | 9/2017 | Koravadi |
| 2018/0158337 A1 | 6/2018 | Koravadi |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2018/0278895 A1* | 9/2018 | Greenwood ............ B60R 1/00 |
| 2019/0016264 A1 | 1/2019 | Potnis et al. |
| 2019/0064831 A1 | 2/2019 | Gali et al. |

\* cited by examiner

VEHICLE TRAILER ANGLE DETECTION SYSTEM USING SHORT RANGE COMMUNICATION DEVICES

CROSS REFERENCE TO RELATED APPLICATION

The present application claims the filing benefits of U.S. provisional application Ser. No. 62/303,546, filed Mar. 4, 2016, which is hereby incorporated herein by reference in its entirety.

FIELD OF THE INVENTION

The present invention relates generally to communication systems for vehicles and, more particularly to a communication system utilizing a short range communication device.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Recently developed Dedicated Short Range Communication (DSRC) radio technology enables communications-based active safety systems. Communication links for such applications need to be reliable, high speed, low latency links that are immune to extreme weather conditions and that work reliably in high speed mobility conditions and multipath roadway environments.

SUMMARY OF THE INVENTION

The present invention provides a driver assistance system or vision system or imaging system for a vehicle that utilizes a dedicated short range communication (DSRC) radio of the vehicle, where the radio signals of a DSRC radio of a trailer being towed by the vehicle may be used to determine the trailer angle of the towed trailer relative to the vehicle.

The present invention comprises a method and apparatus that utilizes the DSRC infrastructure mounted on the trailer for safety and non-safety use cases, such as trailer angle detection. The trailer towed by the vehicle is an extended body of the vehicle and the DSRC radio installed in the vehicle does not broadcast the total length information including the trailer. Also, the trailer has a different lateral position during towing maneuvers. Thus, the system of the present invention, by installing a DSRC radio at the end of the trailer, provides for broadcasting safety messages from the trailer.

The present invention may also utilize a vehicle GPS system that may be an integral part of the DSRC radio to estimate the trailer angle. Trailer angle is one of the inputs in a trailer backup assist application, and by utilizing real time kinematic (RTK) correction methods and triangulation, the present invention may achieve a very high accuracy relative position estimation and hence derive the trailer angle from the relative position information. The estimation of the accurate trailer location and the orientation may be useful for an automatic trailer hitch guidance system as well.

These and other objects, advantages, purposes and features of the present invention will become apparent upon review of the following specification in conjunction with the drawings.

BRIEF DESCRIPTION OF THE DRAWINGS

FIG. 2 shows the DSRC frequency spectrum allocation in the United States;

Figure 1:
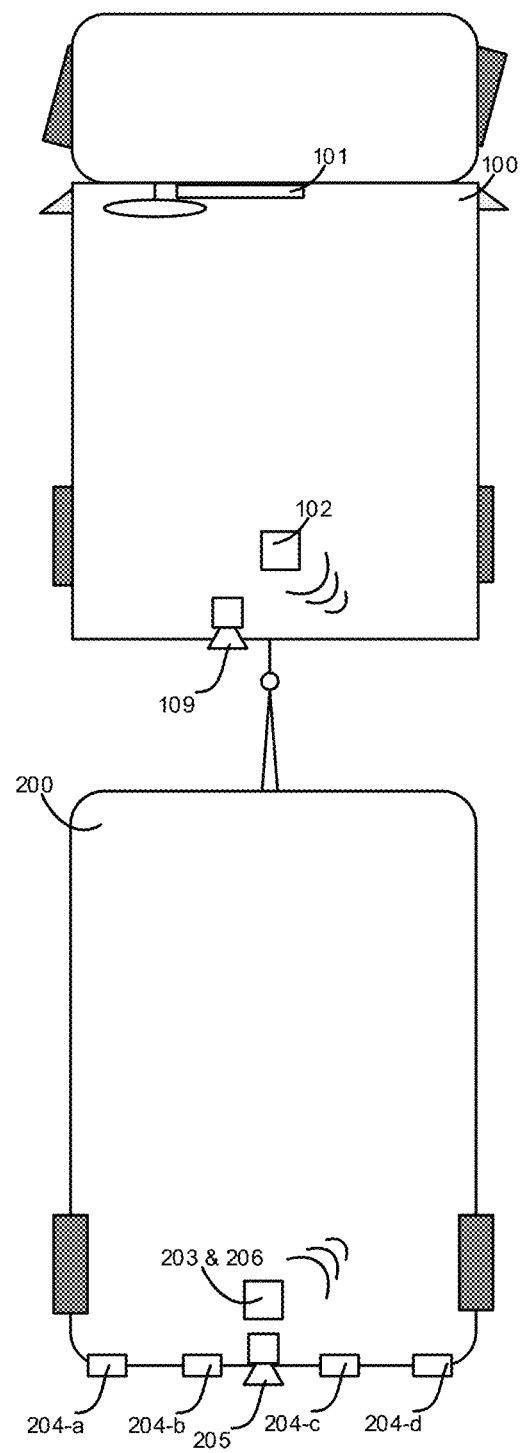
FIG. 1 is a plan view of a vehicle towing a trailer with both the vehicle and trailer having communication devices in accordance with the present invention.

Legend:
100 Vehicle equipped with dual channel DSRC radio system interfaced with HUD/Radio module and vehicle BUS
101 HUD/Radio module integral part of the vehicle
102 Dual channel DSRC radio module
103 Safety channel antenna
104 Non safety channel antenna
105 interface channel between DSRC radio and HUD/Radio unit
106 ECU that estimates the trailer angle utilizing the DSRC data
107 ECU communicate with other modules in the Vehicle BUS
108 Communication link between the ECU and the DSRC radio
109 Backup camera installed in the vehicle
110 DSRC wireless link between DSRC antennas
111 Path of the vehicle trajectory for the hitch assist
200 Trailer equipped with dual channel DSRC radio interfaced with camera module or ultrasonic sensor
201 Safety channel antenna
202 Non safety channel antenna
203 Dual channel DSRC radio interfaced with the ECU (206) mounted on the trailer
204 Ultra sonic sensors used to detect the obstacles behind the trailer
205 Camera mounted on the trailer facing backwards
206 ECU that capture the compressed video data from the camera and ultrasonic sensor data and transmit to the ECU (106) via DSRC radio link
207 wired or wireless communication link between Camera (205) and ECU (206)
208 wired or wireless communication link between DSRC radio (203) and ECU (206)
208 wired or wireless communication link between ultrasonic sensor (204) and ECU (206)
301 RSS-based (received signal strength) relative position estimation algorithm
302 RTK-based relative position estimation algorithm
303 Received Signal Strength (RSS) based relative position output
304 RTK-based relative position output
305 RSS & RTK-based relative position output data fusion and tracking
306 Fused relative position output
307 Trailer angle estimation and tracking algorithm 308 Estimate trailer angle output
309 Trailer angle detection utilizing the backup camera

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Dedicated Short Range Communication (DSRC) radio technology being developed in recent past to enable communications-based active safety systems, communication link for such applications needs a reliable, high speed, low latency that is immune to extreme weather condition, works reliably in high speed mobility conditions and multipath roadway environment.

Even though the main purpose of the DSRC technology is designed for the safety applications in the automotive domain, it is also designed for the no-safety use one of such application could be compressed video transfer. In the U.S., channels 178, 172 and 184 are reserved for safety applications and other SCH channels could be used for non-safety applications (the layout of the DSRC spectrum in the U.S. is shown in FIG. 2).

Referring now to the drawings and the illustrative embodiments depicted therein, a vehicle 100 includes a trailer 200 equipped with dual channel DSRC radios 102 and 203 (FIG. 1). During a trailer reversing or backup maneuver, DSRC radio 203 transmits the compressed video of a backup camera 205 over a non-safety communication channel and the captured images (captured by camera 205) may be displayed as video images on the HUD/Radio unit 101 (or other video display screen) so that driver could be able to see the obstacles that are present to the rear of the trailer 200 (such as by utilizing aspects of the systems described in U.S. patent application Ser. No. 15/367,226, filed Dec. 2, 2016, and published on Jun. 8, 2017 as U.S. Pat. Publication No. US-2017-0158133, which is hereby incorporated herein by reference in its entirety). If the trailer is equipped with ultrasonic sensors 204, then obstacle detection information may be transmitted via DSRC link and displayed on the display 101. When the trailer is equipped with both ultrasonic sensors 204 and the backup camera 205, the fused information of image data and the ultrasonic senor data may be displayed at the display 101 for viewing by the driver of the vehicle while normally operating the vehicle.

Figure 3:
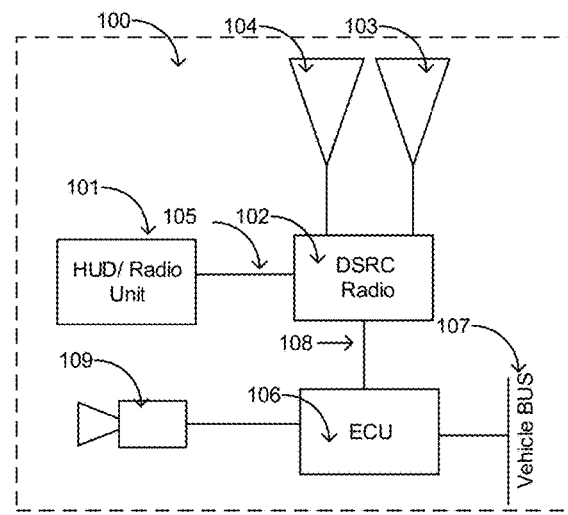
FIGS. 3 and 4 are schematics showing the DSRC radio mounted on the trailer for the compressed video transfer, ultrasonic parking assist (UPA) sensor data transfer and trailer angle detection application of the present invention.

As shown in FIG. 3, the vehicle 100 is equipped with the dual channel DSRC radio 102 connected to the display or HUD/Radio unit 101 via a wired or wireless link 105 and is equipped with an ECU 106 that processes image data captured by the rear backup camera (and that communicates with the DSRC radio 102 via a wired or wireless communication link 108). The DSRC radio 102 includes safety channel antenna 103 and non-safety channel antenna 104.

Figure 4:
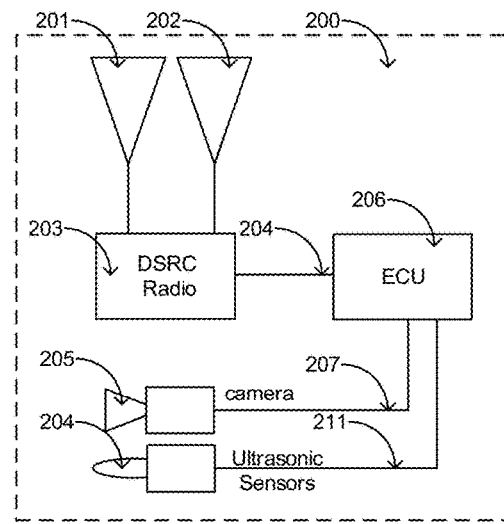

As shown in FIG. 4, the trailer 200 is equipped with a dual channel DSRC radio 203 that is in communication with an ECU 206 via a wired or wireless link 204, and is equipped with a rear backup camera 205 (that is in communication with the ECU via wired or wireless link 207) and one or more ultrasonic sensors 204 (that are in communication with the ECU via wired or wireless link 211). The DSRC radio 203 includes safety channel antenna 201 and non-safety channel antenna 202.

Figure 5:
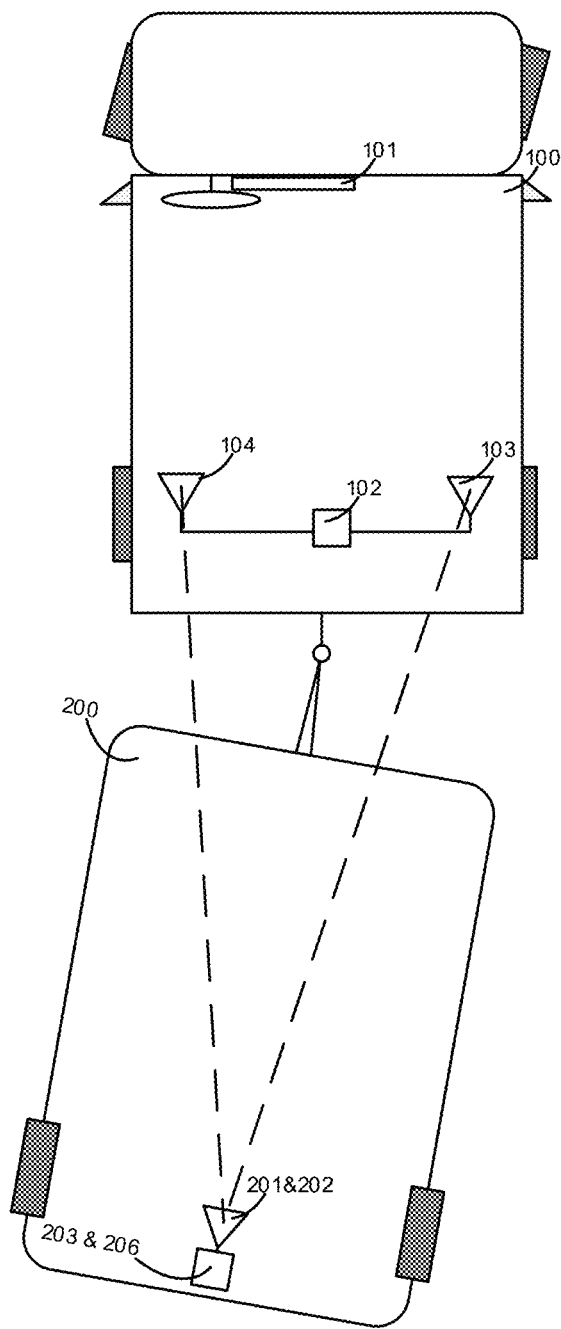
FIG. 5 is a plan view of the vehicle and trailer of FIG. 1, showing the triangulation technique of the present invention.

The present invention utilizes the DSRC radios 203, 206 at the trailer and the DSRC radio 102 at the towing vehicle to determine the trailer angle of the trailer relative to the longitudinal axis of the vehicle. As shown in FIG. 5, the dual antennas 103 and 104 of the DSRC radio 102 may be disposed at the vehicle 100 in spaced apart arrangement that is used in determination of the trailer DSRC antenna location 201 and 202. The system thus utilizes the Received Signal Strength (RSS) received from the two antennae's and estimates the relative position using a triangulation technique.

Figure 6:
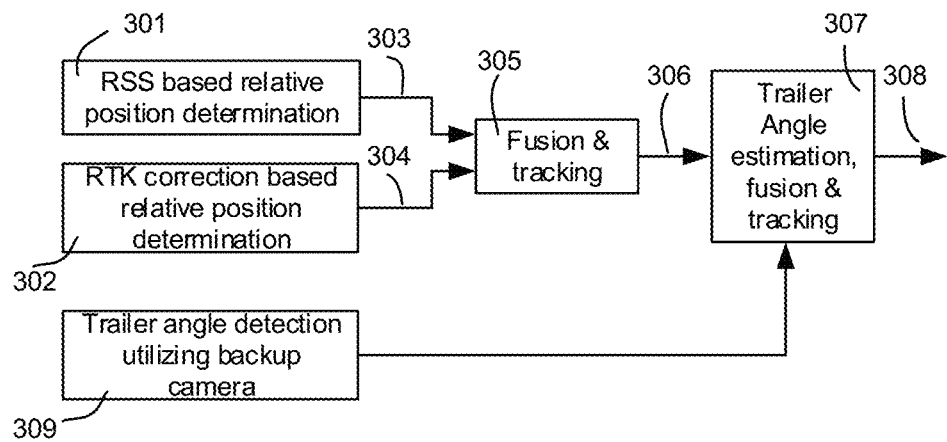
FIG. 6 is a data flow diagram for trailer angle estimation algorithm of the present invention.
Figure 7:
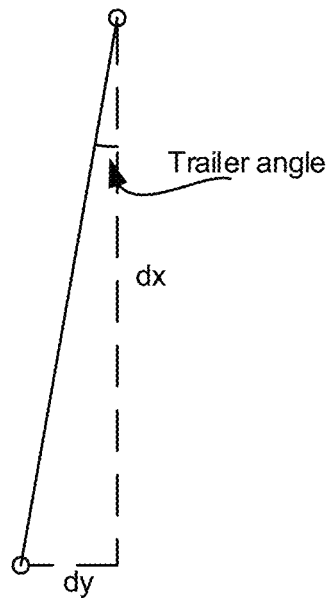
FIG. 7 is a schematic showing the derivation of trailer angle utilizing the relative distance information.

For example, and such as shown in FIG. 6, a trailer angle estimation data flow diagram comprises an RSS based relative distance estimation block 301, which outputs 303 the estimated relative distance information, which is fused (at a fusion and tracking block 305) with the relative distance estimation output 304 of a RTK correction based relative position or distance estimation block 302. The RTK correction based relative distance estimation block utilize the raw GPS information and the DSRC communication link between the two DSRC radio modules to estimate very accurate relative position, this block also outputs the trailer orientation information. The output of the fusion and tracking block 305 is communicated at 306 to and processed by a trailer angle estimation and tracking block 307 to estimate the trailer angle utilizing standard trigonometric function arctan (dy/dx), such as shown in FIG. 7. If the vehicle is equipped with a backup camera 109, the detected trailer angle utilizing the camera is fused and tracked in the block 307 and an estimated trailer angle output 308 is output from the system.

Figure 8:
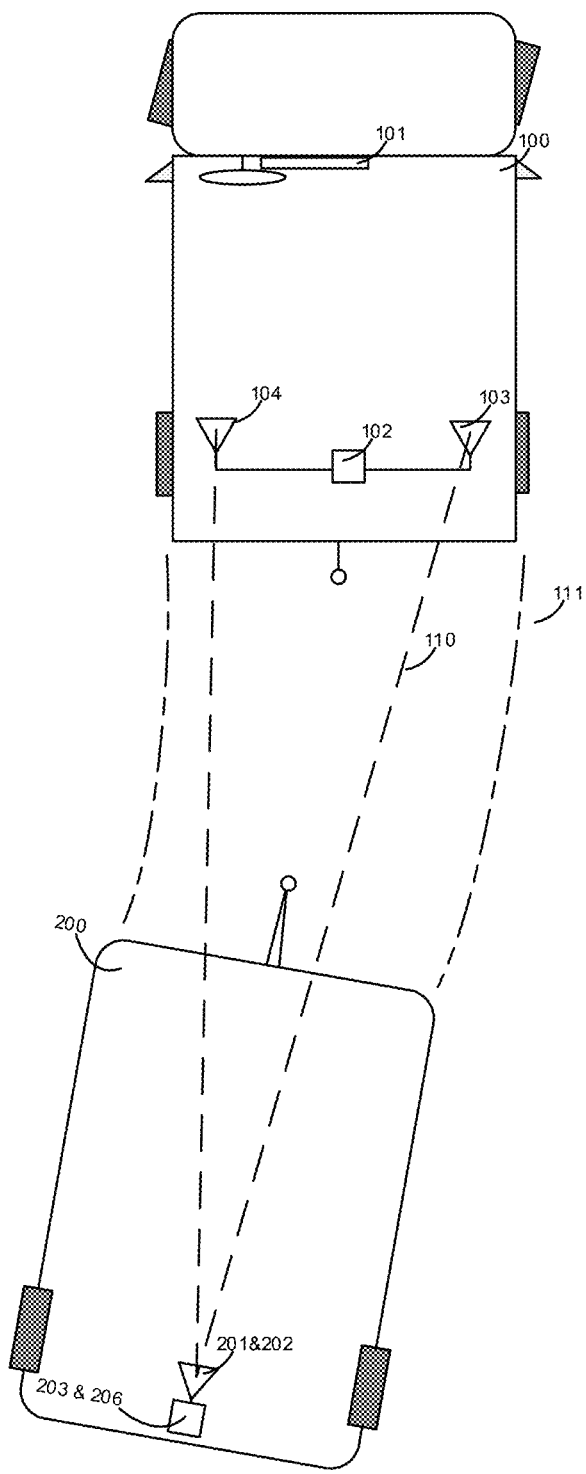
FIG. 8 is a plan view of the vehicle and trailer, showing the DSRC radio application during trailer hitch guidance use case.

Optionally, aspects of the present invention may be utilized to assist a driver of a vehicle in reversing the vehicle towards an unhitched trailer for hitching the trailer to the vehicle. For example, and such as shown in FIG. 8, the trailer hitch guidance use case uses an automated trailer hitch guidance algorithm to control the steering and throttle and brake system of the vehicle 100 along a path 111 to align the vehicle to the hitch of the trailer 200 so that driver can easily attach the trailer to the vehicle. The automated trailer hitch guidance system needs accurate position and orientation of the trailer parked at the back of the vehicle. If the vehicle and the trailer are equipped with dual channel DSRC radios 102 and 203, then utilizing the above described technique, the system can communicate (via DSRC wireless link 110 between DSRC antennas) between the DSRC radios and estimate the relative distance and orientation of the trailer relative to the vehicle to control the vehicle during the reversing maneuver to align the vehicle with the hitch of the trailer.

The communication devices and wireless links may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0158499; US-2015-0124096; US-2015-0251599; US-2015-0352953; US-2016-0210853 and/or US-2016-0381571, which are all hereby incorporated herein by reference in their entireties.

Therefore, the present invention comprises a vehicle system that utilizes a DSRC communication of a DSRC radio of the vehicle to transmit or communicate with a DSRC radio of a trailer. Responsive to such communications, a trailer angle of a hitched trailer relative to the vehicle may be determined. Also, responsive to such communications, a trailer position and angle of an unhitched trailer relative to the vehicle may be determined to assist the driver of the vehicle in aligning the vehicle with the trailer hitch for hitching the trailer to the vehicle. Optionally, the trailer and/or the vehicle may also include a rear backup camera and/or other exterior sensors, whereby image data and/or other data captures by the rear backup camera and/or other sensor (such as one or more ultrasonic sensors) may be communicated for display of video images at a display screen or HUD display for viewing by the driver of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sidewardly/rearwardly facing cameras at respective sides of the vehicle, which capture image data representative of the scene exterior of the vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for a vehicle and a trailer, said communication system comprising:
    a first radio frequency (RF) communication device disposed at a trailer;
    a second radio frequency (RF) communication device disposed at a vehicle;
    wherein at least one of said first RF communication device and said second RF communication device comprises a pair of spaced apart antennae;
    said first RF communication device wirelessly transmitting a communication to said second RF communication device, said second RF communication device receiving the transmitted communication from said first RF communication device;
    wherein, responsive to processing of the transmitted communication received by said second RF communication device, said communication system determines an angle of the trailer relative to the vehicle when the trailer is hitched to the vehicle;
    wherein, responsive to processing of the transmitted communication, said communication system determines the angle of the trailer relative to the vehicle and a location of the trailer relative to the vehicle when the trailer is not hitched to the vehicle to assist the driver in maneuvering the vehicle towards the trailer to hitch the trailer to the vehicle; and
    wherein said first RF communication device at the trailer comprises a pair of spaced apart transmitting antennae, and wherein said communication system is operable to determine the angle of the trailer relative to the vehicle via triangulation based on the pair of spaced apart transmitting antennae of said first RF communication device and a receiving antenna of said second RF communication device.

2. The communication system of claim 1, wherein said first and second RF communication devices comprise first and second dedicated short range communication devices.

3. The communication system of claim 2, wherein each of said first and second dedicated short range communication devices has a first channel dedicated for safety related communication and a second channel dedicated for the transmitted communication.

4. The communication system of claim 1, wherein, responsive to processing of the transmitted communication, said communication system determines the angle of the trailer relative to the vehicle while the trailer is being towed by the vehicle.

5. A communication system for a vehicle and a trailer, said communication system comprising:
    a first radio frequency (RF) communication device disposed at a trailer;
    a second radio frequency (RF) communication device disposed at a vehicle;
    said first RF communication device wirelessly transmitting via at least one transmitting antenna a communication to said second RF communication device, said second RF communication device receiving via at least one receiving antenna the transmitted communication from said first RF communication device;
    wherein at least one selected from the group consisting of (i) said at least one transmitting antenna comprises two spaced apart transmitting antennae and (ii) said at least one receiving antenna comprises two spaced apart receiving antennae;
    wherein, responsive to processing of the transmitted communication received by said second RF communication device, said communication system determines an angle of the trailer relative to the vehicle when the trailer is hitched to the vehicle;
    wherein, responsive to processing of the transmitted communication, said communication system determines the angle of the trailer relative to the vehicle and a location of the trailer relative to the vehicle when the trailer is not hitched to the vehicle to assist the driver in maneuvering the vehicle towards the trailer to hitch the trailer to the vehicle; and
    wherein said at least one transmitting antenna of said first RF communication device at the trailer comprises two spaced apart transmitting antennae, and wherein said communication system is operable to determine the angle of the trailer relative to the vehicle via triangulation based on the spaced apart transmitting antennae of said first RF communication device and said at least one receiving antenna of said second RF communication device.

6. The communication system of claim 5, wherein said first and second RF communication devices comprise first and second dedicated short range communication devices.

7. The communication system of claim 6, wherein each of said first and second dedicated short range communication devices has a first channel dedicated for safety related communication and a second channel dedicated for the transmitted communication.

8. The communication system of claim 5, wherein said at least one receiving antenna of said second RF communication device at the vehicle comprises two spaced apart receiving antennae, and wherein said communication system is operable to determine the angle of the trailer relative to the vehicle via triangulation based on the spaced apart receiving antennae of said second RF communication device and said two spaced apart transmitting antennae of said first RF communication device.

9. The communication system of claim 5, wherein, responsive to processing of the transmitted communication, said communication system determines the angle of the trailer relative to the vehicle while the trailer is being towed by the vehicle.

10. A communication system for a vehicle and a trailer, said communication system comprising:
    a first radio frequency (RF) communication device disposed at a trailer;
    a second radio frequency (RF) communication device disposed at a vehicle;
    wherein said first and second RF communication devices comprise first and second dedicated short range communication devices;
    wherein said first RF communication device comprises a pair of spaced apart antennae;
    said first RF communication device wirelessly transmitting a communication to said second RF communication device, said second RF communication device receiving the transmitted communication from said first RF communication device;
    wherein, responsive to processing of the transmitted communication received by said second RF communication device, said communication system determines an angle of the trailer relative to the vehicle when the trailer is hitched to the vehicle;

wherein said communication system is operable to determine the angle of the trailer relative to the vehicle via triangulation based on an antenna of one of said second RF communication device and spaced apart antennae of said first RF communication device; and wherein, responsive to processing of the transmitted communication, said communication system determines the angle of the trailer relative to the vehicle and a location of the trailer relative to the vehicle when the trailer is not hitched to the vehicle to assist the driver in maneuvering the vehicle towards the trailer to hitch the trailer to the vehicle.

11. The communication system of claim 10, wherein each of said first and second dedicated short range communication devices has a first channel dedicated for safety related communication and a second channel dedicated for the transmitted communication.

12. The communication system of claim 10, wherein, responsive to processing of the transmitted communication, said communication system determines the angle of the trailer relative to the vehicle while the trailer is being towed by the vehicle.

13. The communication system of claim 10, comprising a camera disposed at the trailer, wherein said first RF communication device communicates image data captured by said camera to said second RF communication device.

* * * * *